US010351164B2

(12) United States Patent
Ogawa et al.

(10) Patent No.: US 10,351,164 B2
(45) Date of Patent: Jul. 16, 2019

(54) VEHICLE CONTROL DEVICE

(71) Applicant: Mazda Motor Corporation, Aki-gun, Hiroshima (JP)

(72) Inventors: Daisaku Ogawa, Hiroshima (JP); Daisuke Umetsu, Hiroshima (JP); Osamu Sunahara, Hiroshima (JP); Yasunori Takahara, Hiroshima (JP); Yuichiro Akiya, Hiroshima (JP); Chikako Ohisa, Aki-gun (JP); Atsushi Yamasaki, Hiroshima (JP); Keiichi Hiwatashi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/899,750

(22) Filed: Feb. 20, 2018

(65) Prior Publication Data

US 2018/0265119 A1    Sep. 20, 2018

(30) Foreign Application Priority Data

Mar. 17, 2017  (JP) ................................. 2017-052424

(51) Int. Cl.
*G05B 17/00* (2006.01)
*B62D 5/04* (2006.01)
(Continued)

(52) U.S. Cl.
CPC ........ *B62D 5/0463* (2013.01); *B60L 15/2072* (2013.01); *B60W 10/06* (2013.01);
(Continued)

(58) Field of Classification Search
CPC .......................... B62D 5/0463; B60L 15/2072
(Continued)

(56) References Cited

U.S. PATENT DOCUMENTS

2006/0259225 A1*  11/2006  Ono ..................... B60G 17/016
                                               701/82
2014/0373810 A1*  12/2014  Grob ................... F02D 41/0087
                                               123/349
(Continued)

FOREIGN PATENT DOCUMENTS

JP          2014166014 A      9/2014

*Primary Examiner* — Erick D Glass
(74) *Attorney, Agent, or Firm* — Alleman Hall Creasman & Tuttle LLP

(57) ABSTRACT

A vehicle control device is provided, which includes a drive source configured to generate torque as driving force of a vehicle, a transmission torque control mechanism configured to control transmission torque to drive wheels according to the generated torque, and a processor configured to execute a vehicle attitude controlling module to perform a vehicle attitude control by controlling the transmission torque control mechanism to reduce the transmission torque so as to decelerate the vehicle when a starting condition that the vehicle is traveling and a steering angle related value increases is satisfied, and then, when a given terminating condition is satisfied, controlling the mechanism to resume the transmission torque back to the torque before being reduced. The transmission torque is controlled so as to cause a yaw rate that occurs in the vehicle while the vehicle attitude control is performed, to be lower than an upper limit yaw rate.

19 Claims, 10 Drawing Sheets

(51) Int. Cl.
*B60W 10/06* (2006.01)
*G05D 1/08* (2006.01)
*B60L 15/20* (2006.01)

(52) U.S. Cl.
CPC ............ *G05D 1/08* (2013.01); *B60L 2240/12* (2013.01); *B60L 2240/14* (2013.01); *B60L 2240/22* (2013.01); *B60L 2240/423* (2013.01); *B60L 2240/461* (2013.01); *B60L 2240/463* (2013.01); *B60L 2250/26* (2013.01); *B60L 2260/26* (2013.01); *B60W 2510/0661* (2013.01)

(58) Field of Classification Search
USPC ........................................................ 318/689
See application file for complete search history.

(56) References Cited

U.S. PATENT DOCUMENTS

2015/0175009 A1* 6/2015 Beever .................. B60K 7/0007
                                                                                                            701/22
2016/0297439 A1* 10/2016 Inoue .................. B60W 10/184
2016/0297478 A1* 10/2016 Inoue ...................... B60T 8/246

* cited by examiner

VEHICLE CONTROL DEVICE

TECHNICAL FIELD

The present disclosure relates to a vehicle control device, and particularly to a vehicle control device which achieves a desired vehicle attitude (vehicle behavior) by performing a torque control.

BACKGROUND OF THE DISCLOSURE

Conventionally, devices which control the behavior of a vehicle to a safer direction when the behavior of the vehicle becomes unstable due to a slip, etc. (such as an antiskid brake system (ABS)) are known. For example, devices which detect that behavior such as understeering or oversteering occurs in the vehicle during cornering, etc. of the vehicle, and apply a suitable deceleration to the vehicle so that the behavior is controlled, are known.

Meanwhile, vehicle movement controllers are known, which adjust a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control performed for safety improvement in the traveling state where the behavior of the vehicle becomes unstable.

Further, JP2014-166014A discloses a behavior control device for a vehicle which reduces a driving force (torque) of the vehicle according to a yaw-rate related amount which corresponds to a steering operation by a vehicle driver (e.g., yaw acceleration) to quickly decelerate the vehicle when the driver starts the steering operation, so that a sufficient load is quickly applied to front wheels which are steerable wheels. According to this behavior control device, since the loads are quickly applied to the front wheels when the steering operation is started, a frictional force between the front wheels and a road surface increases, and a cornering force of the front wheels increases. Therefore, turnability of the vehicle in an early stage of curve entry improves, and a response to the steering-in operation (steering stability) improves. Thus, a vehicle behavior intended by the driver is achieved.

However, when a control (vehicle attitude control) for reducing the engine torque to decelerate the vehicle according to the steering operation of the driver during a vehicle turn is performed as in JP2014-166014A, a yaw rate larger than that expected by the driver may occur in the vehicle. In one example, when the steerable wheels (front wheels) are forcibly steered due to disturbances such as an uneven road surface and influence of side wind during the vehicle attitude control, a large yaw rate unintended by the driver occurs in the vehicle. In this case, the vehicle comes to be in an oversteered state, failing to realize the turn expected by the driver.

SUMMARY OF THE DISCLOSURE

The present disclosure is made in view of solving the issues of the conventional arts described above, and aims to provide a vehicle control device, which suitably prevents occurrence of an excessive yaw rate when a vehicle attitude control in which the vehicle is decelerated according to a steering operation is performed.

According to one aspect of the present disclosure, a vehicle control device is provided, which includes a drive source configured to generate torque as a driving force of a vehicle, a transmission torque control mechanism configured to control transmission torque to drive wheels of the vehicle according to the generated torque, and a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied. The vehicle attitude controlling module controls the transmission torque by the transmission torque control mechanism so as to cause a yaw rate that occurs in the vehicle while the vehicle attitude control is performed, to be lower than an upper limit yaw rate.

With the above configuration, while the vehicle attitude control in which the engine torque is reduced so as to decelerate the vehicle according to the steering angle related value is performed, the yaw rate that occurs in the vehicle (actual yaw rate) is suitably brought lower than the upper limit yaw rate. Therefore, a turn intended by a driver of the vehicle is achieved by the vehicle attitude control.

The vehicle attitude controlling module may control at least one of a change amount of the transmission torque in the resuming direction, a change rate of the transmission torque in the resuming direction, and a timing of starting the resumption of the transmission torque.

With the above configuration, the resumption of the transmission torque is promptly performed, and it is prevented that the actual yaw rate exceeds the upper limit yaw rate at a timing close to a latter half of the vehicle attitude control (near the torque resumption start timing).

The drive source may be an engine including a plurality of cylinders. The vehicle attitude controlling module may reduce the transmission torque of the drive wheels by increasing at least one of a reduction amount and a reduction rate of the generated torque by the engine while the vehicle attitude control is performed, as a combustion frequency of the engine per unit time decreases.

With the above configuration, in a case where the vehicle attitude control is performed when the combustion frequency of the engine is low, the torque reduction by the vehicle attitude control is suitably secured, that is, degradation of a response of the torque reduction is prevented. As a result, it is suitably prevented that a desired vehicle behavior in turning is not achieved and the driver feels a sense of discomfort due to executing the vehicle attitude control when the combustion frequency of the engine is low.

The drive source may be an engine. The vehicle attitude controlling module may reduce the transmission torque of the drive wheels by increasing at least one of a reduction amount and a reduction rate of the generated torque by the engine while the vehicle attitude control is performed, as a speed of the engine decreases.

Although the combustion frequency of the engine per unit time decreases as the engine speed decreases, with the above configuration, it is suitably prevented that the desired vehicle behavior in turning is not achieved and the driver feels a sense of discomfort due to executing the vehicle attitude control when the engine speed is low.

The drive source may be an engine including a plurality of cylinders and configured to be switchable of an operation mode between a reduced-cylinder operation in which combustion in one or some of the plurality of cylinders is suspended and an all-cylinder operation in which combustion is performed in all the plurality of cylinders. When the engine performs the reduced-cylinder operation, the vehicle attitude controlling module may reduce the transmission torque of the drive wheels by increasing at least one of a reduction amount and a reduction rate of the generated torque by the engine while the vehicle attitude control is performed, to be larger than when the engine performs the all-cylinder operation.

Although the combustion frequency of the engine per unit time decreases during the reduced-cylinder operation than the all-cylinder operation, with the above configuration, it is suitably prevented that the desired vehicle behavior in turning is not achieved and the driver feels a sense of discomfort due to executing the vehicle attitude control during the reduced-cylinder operation.

The vehicle control device may further include a yaw rate sensor configured to detect a yaw rate that occurs in the vehicle. Based on the yaw rate detected by the yaw rate sensor, the vehicle attitude controlling module may control the transmission torque by the transmission torque control mechanism so as to cause the yaw rate to be lower than the upper limit yaw rate.

With the above configuration, by monitoring the actual yaw rate detected by the yaw rate sensor, the actual yaw rate during the vehicle attitude control is suitably brought lower than the upper limit yaw rate.

The vehicle control device may further include memory configured to store a map defining the transmission torque with which the yaw rate that occurs in the vehicle while the vehicle attitude control is performed falls below the upper limit yaw rate. The vehicle attitude controlling module may control the transmission torque by the transmission torque control mechanism based on the transmission torque defined in the map stored in the memory.

With the above configuration, by using the map defined beforehand, the actual yaw rate during the vehicle attitude control is suitably brought lower than the upper limit yaw rate with a comparatively simple control and processing.

The vehicle control device may further include a steering angle sensor configured to detect the steering angle of the steering device. The vehicle attitude controlling module may determine that the steering angle related value increases when a change rate of the detected steering angle is higher than a given speed.

According to another aspect of the present disclosure, a vehicle control device is provided, which includes a drive source configured to generate torque as driving force of a vehicle, a transmission torque control mechanism configured to control transmission torque to drive wheels of the vehicle according to the generated torque, and a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied. The vehicle attitude controlling module controls the transmission torque by the transmission torque control mechanism so as to prevent the vehicle from being oversteered while the vehicle attitude control is performed.

With the above configuration, it is suitably prevented that the vehicle comes to be in the oversteered state during the vehicle attitude control. Therefore, the turn intended by the driver is achieved by the vehicle attitude control.

According to still another aspect of the present disclosure, a vehicle control device is provided, which includes a drive source configured to generate torque as a driving force of a vehicle, a transmission torque control mechanism configured to control transmission torque to drive wheels of the vehicle according to the generated torque, a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied, and a yaw rate sensor configured to detect a yaw rate that occurs in the vehicle. The vehicle attitude controlling module controls the transmission torque by the transmission torque control mechanism to cause the yaw rate detected by the yaw rate sensor while the vehicle attitude control is performed, to be lower than an upper limit yaw rate.

With the above configuration, by bringing the yaw rate during the vehicle attitude control to be lower than the upper limit yaw rate, the turn intended by the driver is achieved by the vehicle attitude control.

According to still another aspect of the present disclosure, a vehicle control device is provided, which includes a drive source configured to generate torque as a driving force of a vehicle, a transmission torque control mechanism configured to control transmission torque to drive wheels of the vehicle according to the generated torque, a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied, and memory configured to store a map defining the transmission torque with which a yaw rate that occurs in the vehicle while the vehicle attitude control is performed falls below an upper limit yaw rate. The vehicle attitude controlling module controls the transmission torque by the transmission torque control mechanism based on the transmission torque defined in the map stored in the memory.

With the above configuration, by bringing the yaw rate during the vehicle attitude control to be lower than the upper limit yaw rate, the turn intended by the driver is achieved by the vehicle attitude control.

DETAILED DESCRIPTION OF THE DISCLOSURE

Hereinafter, a vehicle control device according to one embodiment of the present disclosure is described with reference to the accompanying drawings.

<System Configuration>

Figure 1:
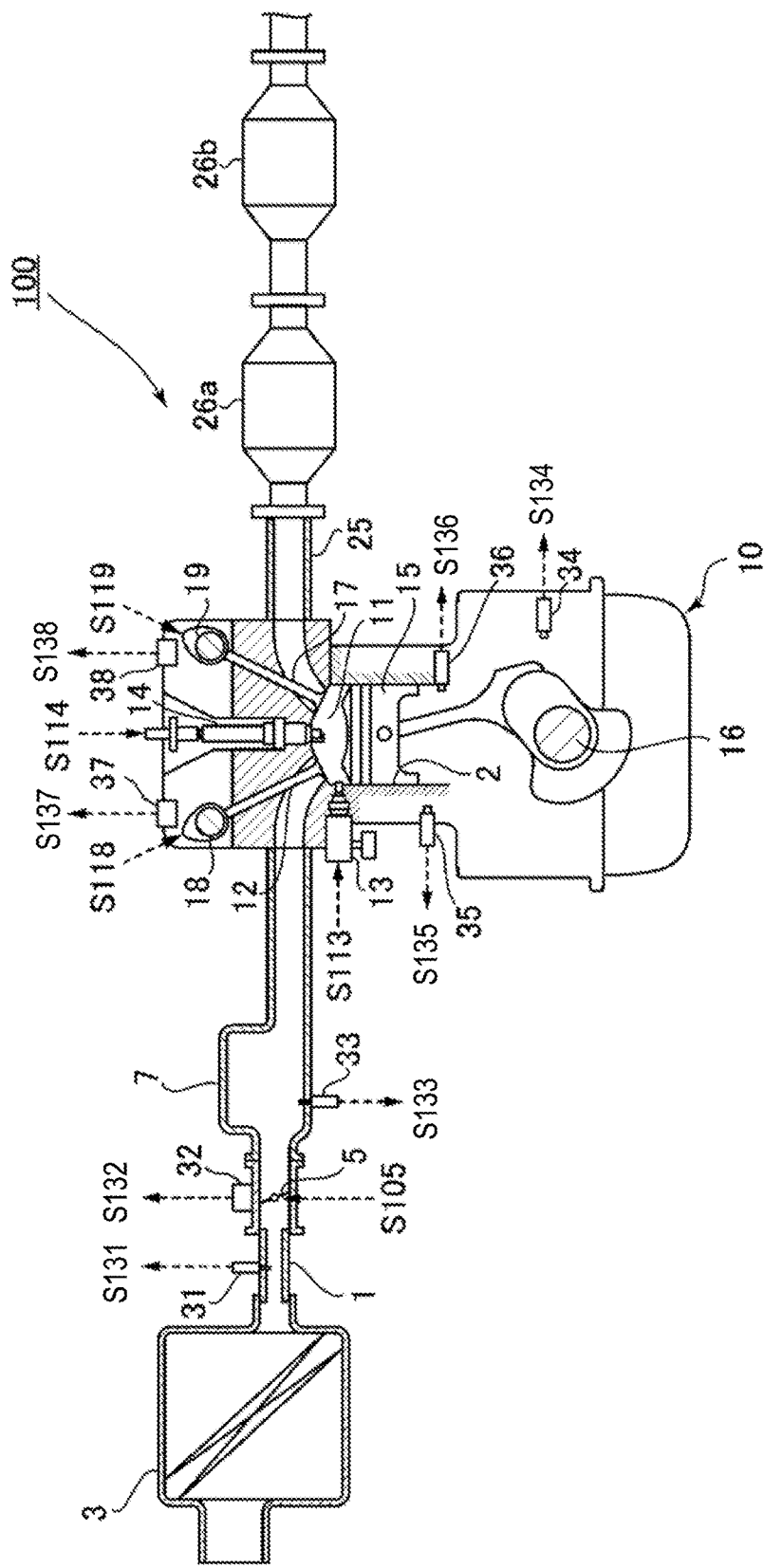
FIG. 1 is a schematic configuration view of an engine system to which a vehicle control device according to one embodiment of the present disclosure is applied.
Figure 2:
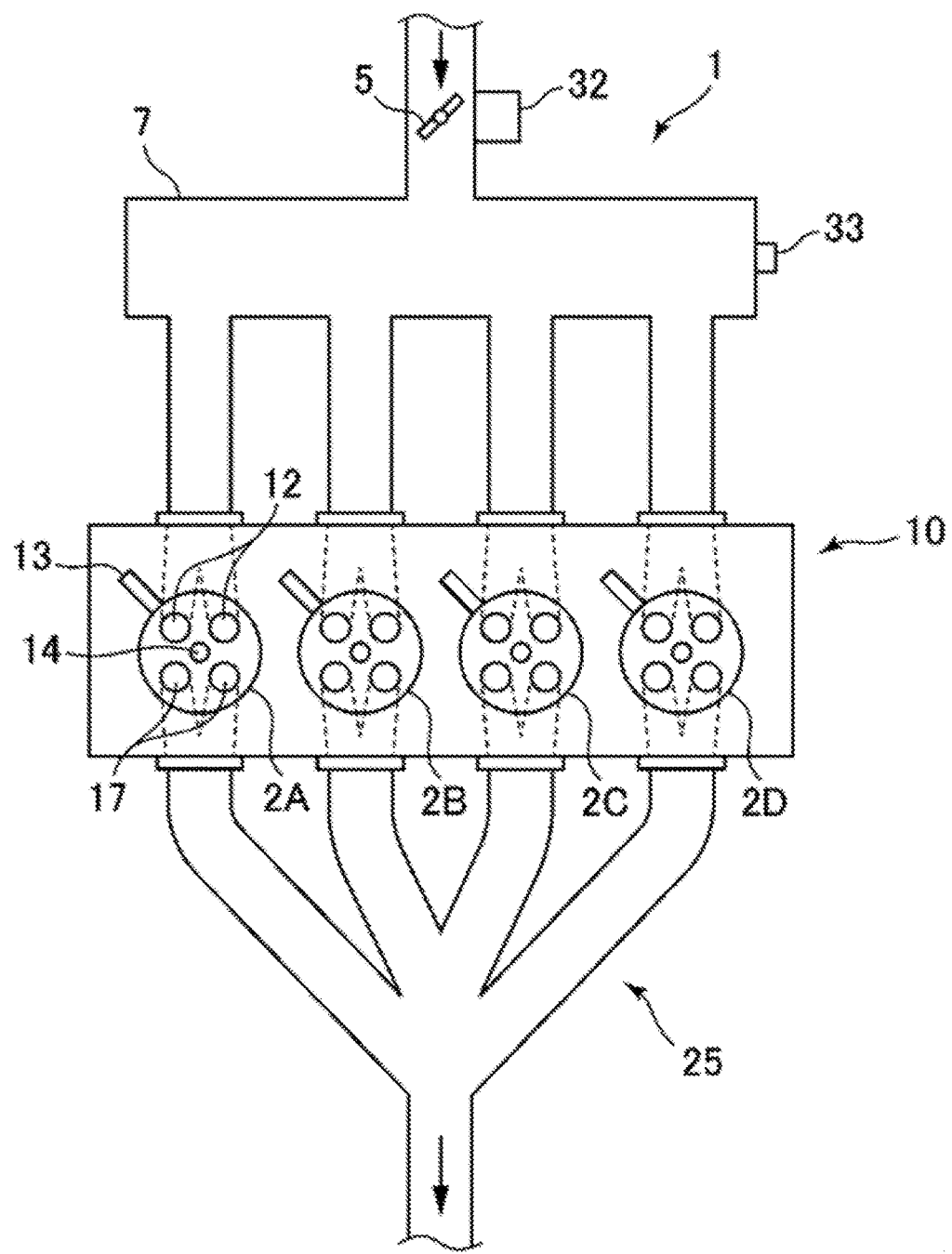
FIG. 2 is a schematic plan view of an engine according to the embodiment of the present disclosure.
Figure 3:
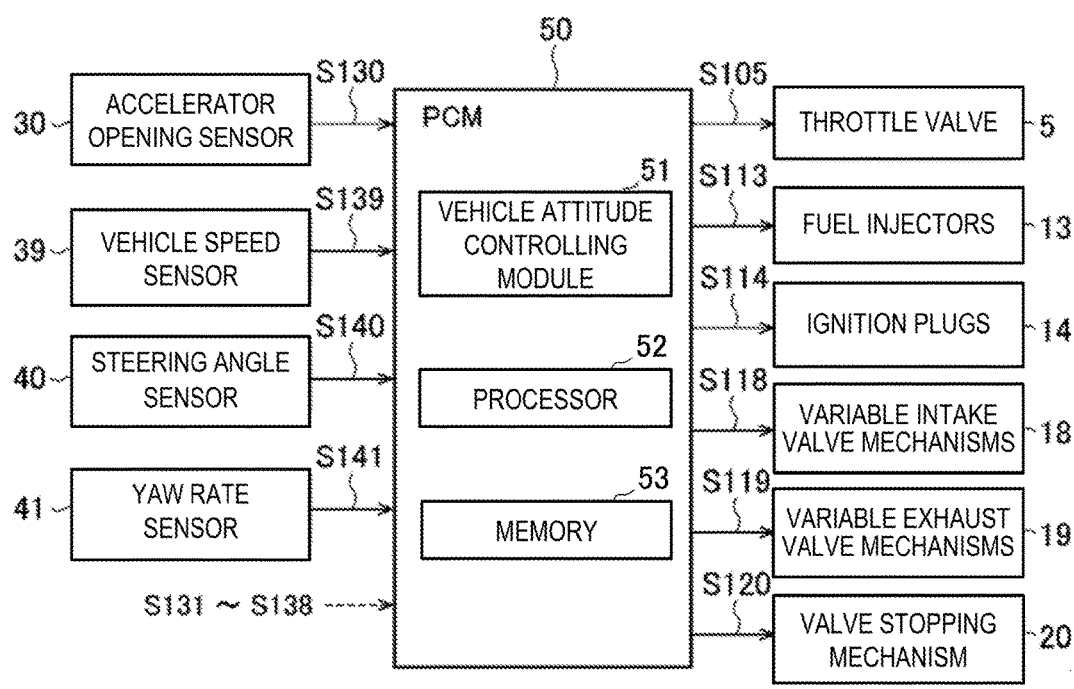
FIG. 3 is a block diagram illustrating an electric configuration of the vehicle control device according to the embodiment of the present disclosure.

First, an engine system to which the vehicle control device according to this embodiment is applied is described with reference to FIGS. 1 to 3. FIG. 1 is a schematic configuration view of the engine system to which the vehicle control device is applied according to the embodiment of the present disclosure. FIG. 2 is a schematic plan view of an engine according to the embodiment of the present disclosure. FIG. 3 is a block diagram illustrating an electric configuration of the vehicle control device according to the embodiment of the present disclosure.

As illustrated in FIGS. 1 and 3, an engine system 100 mainly has an intake passage 1 through which intake air (air) externally introduced passes, an engine 10 (particularly, a gasoline engine) configured to generate a driving force for a vehicle on which the engine 10 is mounted by combusting a mixture gas of the intake air supplied from the intake passage 1 and fuel supplied from a fuel injector 13 (described later), an exhaust passage 25 through which exhaust gas generated by the combustion inside the engine 10 is discharged, sensors 30 to 41 configured to detect various kinds of states regarding the engine system 100, and a PCM (Power-train Control Module) 50 configured to control the entire engine system 100.

In the intake passage 1, an air cleaner 3 configured to purify the externally introduced intake air, a throttle valve 5 configured to adjust an amount of intake air passing therethrough (intake air amount), and a surge tank 7 configured to temporarily store intake air to be supplied to the engine 10 are arranged in this order from upstream side.

As illustrated in FIG. 2, the engine 10 of this embodiment is an inline four-cylinder engine including four cylinders 2 (2A to 2D) arranged in line. This engine 10 also has an intake valve 12 (two intake valves for each cylinder in this embodiment) configured to introduce the intake air supplied from the intake passage 1 into a combustion chamber 11, the fuel injector 13 configured to inject the fuel into the combustion chamber 11, an ignition plug 14 configured to ignite the mixture gas of the intake air and the fuel supplied into the combustion chamber 11, a piston 15 configured to reciprocate by combustion of the mixture gas inside the combustion chamber 11, a crankshaft 16 configured to rotate by the reciprocation motion of the piston 15, and an exhaust valve 17 (two exhaust valves for each cylinder in this embodiment) configured to discharge the exhaust gas generated by the combustion of the mixture gas inside the combustion chamber 11 to the exhaust passage 25.

The piston 15 is provided in each of the cylinders 2A to 2D and they reciprocate with a phase difference of 180° in crank angle (180° CA) from each other. Accordingly, ignition timings of the respective cylinders 2A to 2D vary 180° CA from each other.

The engine 10 of this embodiment is a cylinder deactivation engine where an operation in which two of the four cylinders 2A to 2D are suspended while the remaining two cylinders operate, that is, a reduced-cylinder operation is performable.

For example, when the cylinder 2A is the first cylinder, the cylinder 2B is the second cylinder, the cylinder 2C is the third cylinder, and the cylinder 2D is the fourth cylinder in this order from the left side in FIG. 2, during an all-cylinder operation in which all of the four cylinders 2A to 2D are operated (in an all-cylinder operation mode), the ignition is performed in the order of the first cylinder 2A, the third cylinder 2C, the fourth cylinder 2D, and the second cylinder 2B.

Further, during the reduced-cylinder operation (in a reduced-cylinder operation mode), the ignition operation of the ignition plug 14 is prohibited for two of the cylinders of which the order of ignition is not successive (the first cylinder 2A and the fourth cylinder 2D in this embodiment), and the ignition is alternately performed in the remaining two cylinders (that is, the third cylinder 2C and the second cylinder 2B).

Moreover, the engine 10 is variable of operation timings of the intake valve 12 and the exhaust valve 17 (corresponding to valve phases) by a variable intake valve mechanism 18 and a variable exhaust valve mechanism 19 which are variable valve timing mechanisms, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

The engine 10 also has a valve stopping mechanism 20 configured to stop opening and closing operations of the intake valves 12 and the exhaust valves 17 of the first cylinder 2A and the fourth cylinder 2D during the reduced-cylinder operation. The valve stopping mechanism 20 includes, for example, a so-called lost motion mechanism which intervenes between a cam and the valve, and enables or disables a transmission of a driving force of the cam to the valve. Alternatively, the valve stopping mechanism 20 may include two kinds of cams having different cam profiles, i.e., a first cam having a cam nose that performs an opening and closing operation of the valve and a second cam that stops the opening and closing operation, and a so-called cam shifting mechanism configured to selectively transmit an operation state of one of the first and second cams.

In the exhaust passage 25, exhaust purification catalysts 26a and 26b having an exhaust gas purifying function (such as a $NO_x$ catalyst, a three-way catalyst, or an oxidation catalyst) are mainly provided. Hereinafter, when referring to the exhaust purification catalysts 26a and 26b without distinguishing one from the other, they are simply referred to as "the exhaust purification catalyst 26."

Further, the engine system 100 is provided with the sensors 30 to 41 configured to detect the various kinds of states regarding the engine system 100. That is, the accelerator opening sensor 30 detects an accelerator opening which is an opening of an accelerator pedal (corresponding to a depression amount of the accelerator pedal by a vehicle driver). The airflow sensor 31 detects an intake air amount corresponding to a flow rate of the intake air that passes through the intake passage 1. The throttle opening sensor 32 detects a throttle opening that is an opening of the throttle valve 5. The pressure sensor 33 detects pressure inside an intake manifold corresponding to intake air pressure that is applied to the engine 10. The crank angle sensor 34 detects a crank angle of the crankshaft 16. The water temperature sensor 35 detects a temperature of a coolant which cools the engine 10 (water temperature). The temperature sensor 36 detects a temperature inside the cylinder 2 of the engine (in-cylinder temperature). The cam angle sensors 37 and 38 detect operation timings, including close timings, of the intake valve 12 and the exhaust valve 17, respectively. The vehicle speed sensor 39 detects a speed of the vehicle (vehicle speed). The steering angle sensor 40 detects a rotational angle of a steering wheel (steering angle). The yaw rate sensor 41 detects a yaw rate which occurs in the vehicle. The steering wheel may be one example of the "steering device." These various sensors 30 to 41 output to the PCM 50 detection signals S130 to S141 corresponding to the detected parameters.

The PCM 50 controls various components of the engine system 100 based on the detection signals S130 to S141 received from the various sensors 30 to 41 described above. For example, as illustrated in FIG. 3, the PCM 50 supplies a control signal S105 to the throttle valve 5 to control the open and close timings and opening of the throttle valve 5, supplies a control signal S113 to the fuel injector 13 to control a fuel injection amount and a fuel injection timing, supplies a control signal S114 to the ignition plug 14 to control the ignition timing, supplies control signals S118 and S119 to the variable intake valve mechanism 18 and the variable exhaust valve mechanism 19 to control the operation timings of the intake valve 12 and the exhaust valve 17, respectively, and supplies a control signal S120 to the valve stopping mechanism 20 to control the open and close operations of the intake and exhaust valves 12 and 17 of the first and fourth cylinders 2A and 2D. Note that the throttle valve 5, the fuel injector 13, the ignition plug 14, the variable intake valve mechanism 18, and the variable exhaust valve mechanism 19 may be examples of the "transmission torque control mechanism."

In this embodiment, the PCM 50 has the following functional components. For example, the PCM 50 includes a vehicle attitude controlling module 51 configured to perform a vehicle attitude control in which the attitude of the vehicle is controlled by reducing a torque of the engine 10 to decelerate the vehicle when a condition that the vehicle is traveling and a steering angle related value which is related to a steering angle of the steering wheel (typically, a steering rate) increases (vehicle attitude control starting/executing condition) is satisfied. When a given condition for terminating the vehicle attitude control (vehicle attitude control terminating condition) is satisfied, the vehicle attitude controlling module 51 controls the engine 10 to resume the torque back to that before the vehicle attitude control. Note that the vehicle attitude control may suitably be referred to as a "torque reduction control."

The vehicle attitude controlling module 51 sets a torque reduction amount and/or a torque reduction rate in the vehicle attitude control based on the operation mode of the engine 10 (the reduced-cylinder operation or the all-cylinder operation) and the engine speed. For example, the vehicle attitude controlling module 51 sets the torque reduction amount and/or the torque reduction rate to be larger during the reduced-cylinder operation than during the all-cylinder operation, and also larger as the engine speed decreases. The vehicle attitude controlling module 51 also sets a timing of resuming the engine torque to that before it is reduced in the vehicle attitude control (hereinafter, simply referred to as "torque resumption start timing") based on the operation mode of the engine 10 and the engine speed. For example, the vehicle attitude controlling module 51 sets the torque resumption start timing to be earlier during the reduced-cylinder operation than during the all-cylinder operation, and also earlier as the engine speed decreases. Here, the vehicle attitude controlling module 51 advances the torque resumption start timing by loosening the vehicle attitude control terminating condition described above.

Moreover, while the vehicle attitude control is performed as described above (which means a period from the start of engine torque reduction until the end of the engine torque resumption, the vehicle attitude controlling module 51 corrects the engine torque applied in the vehicle attitude control by comparing the yaw rate detected by the yaw rate sensor 41 (actual yaw rate) and a given upper limit yaw rate. For example, when the actual yaw rate exceeds the upper limit yaw rate, the vehicle attitude controlling module 51 corrects the currently-applied engine torque, typically, corrects the torque reduction amount (absolute value) to be smaller. In this manner, the yaw rate which occurs in the vehicle while the vehicle attitude control is performed is brought lower than the upper limit yaw rate.

The components of the PCM 50 are configured by a computer including a processor 52 (e.g. a CPU (central processing unit)) and internal memory 53, such as ROM(s) and RAM(s) configured to store various programs which are interpreted and executed on by the processor 52 (the programs include a basic control program (e.g., an OS) and an application program activated on the OS and configured to achieve a particular function), and various data. The processor 52 is configured to execute the vehicle attitude controlling module 51 to perform its associated function. The module is stored in the internal memory 53 as one or more software programs.

Figure 4:
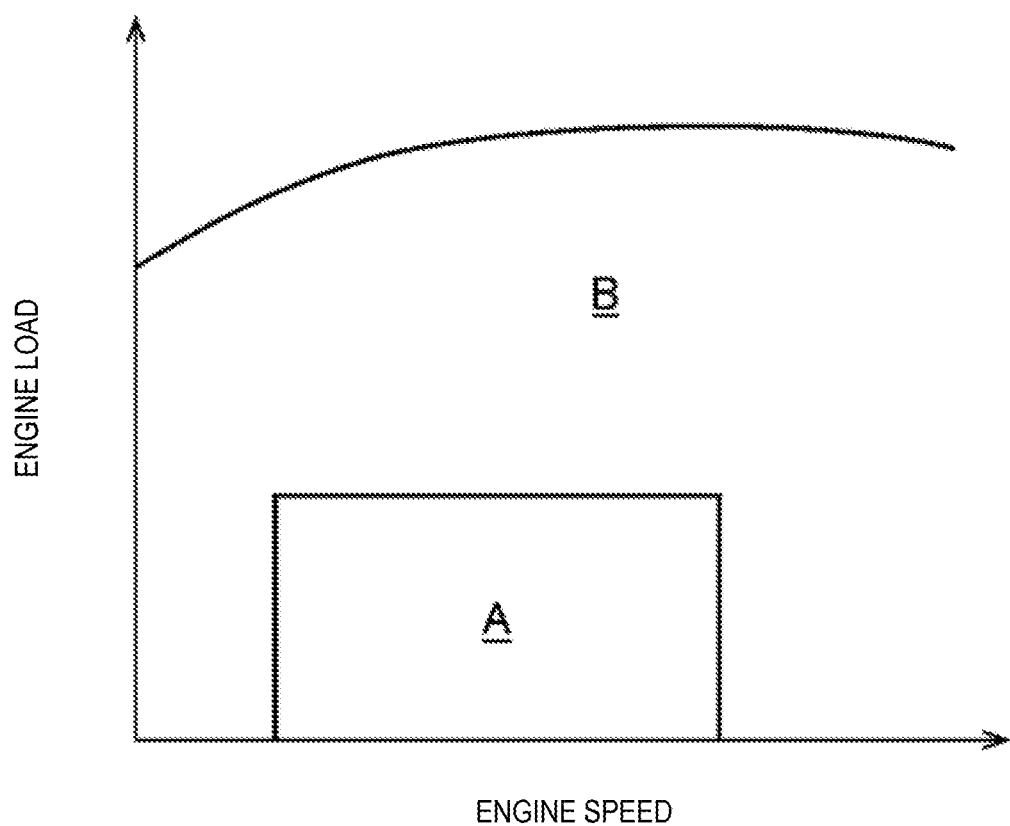
FIG. 4 is a map conceptually illustrating an operating range of the engine where an operation mode is switched according to the embodiment of the present disclosure.

Here, operating ranges of the engine where the reduced-cylinder operation and the all-cylinder operation are performed respectively in this embodiment are described with reference to FIG. 4. FIG. 4 is a map conceptually illustrating an operating range of the engine where the operation mode of the engine is switched (between the reduced-cylinder operation and the all-cylinder operation) according to the embodiment of the present disclosure, in which the horizontal axis indicates the engine speed and the vertical axis indicates an engine load.

As illustrated in FIG. 4, a reduced-cylinder operation range A where the reduced-cylinder operation is performed is set within a range where the engine speed and the engine load are relatively low, and an all-cylinder operation range B where the all-cylinder operation is performed is set outside the reduced-cylinder operation range. With reference to such a map, the PCM 50 determines which of the reduced-cylinder operation range A and the all-cylinder operation range B an engine speed and an engine load concerned correspond to. Based on the determination result, the PCM 50 controls the open and close operations of the intake and exhaust valves 12 and 17 of the first and fourth cylinders 2A and 2D so as to perform one of the reduced-cylinder operation and the all-cylinder operation.

Contents of Control in this Embodiment

Next, a control performed by the vehicle control device of this embodiment of the present disclosure is described with reference to FIGS. 5 to 9.

Figure 5:
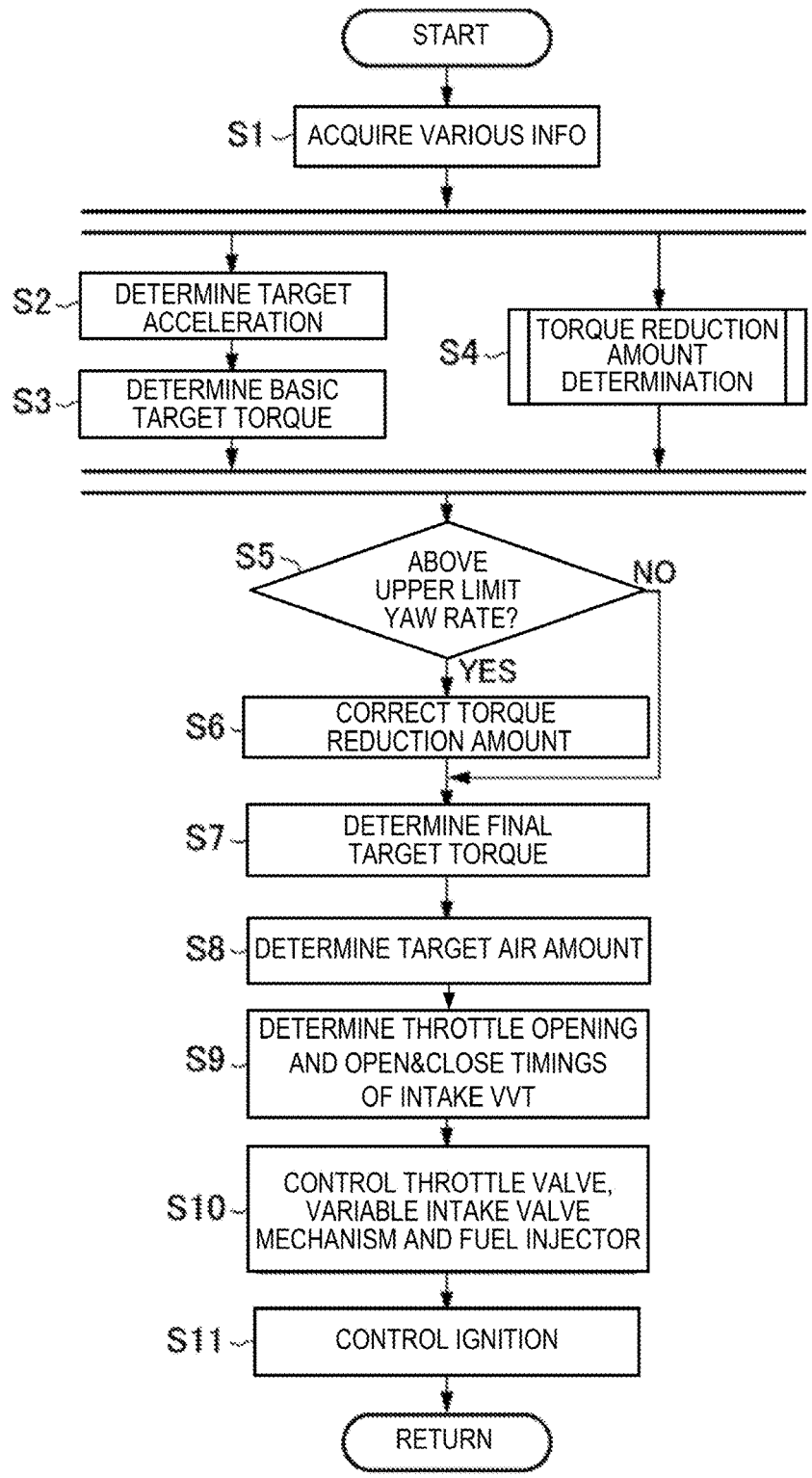
FIG. 5 is a flowchart illustrating an engine control according to the embodiment of the present disclosure.
Figure 6:
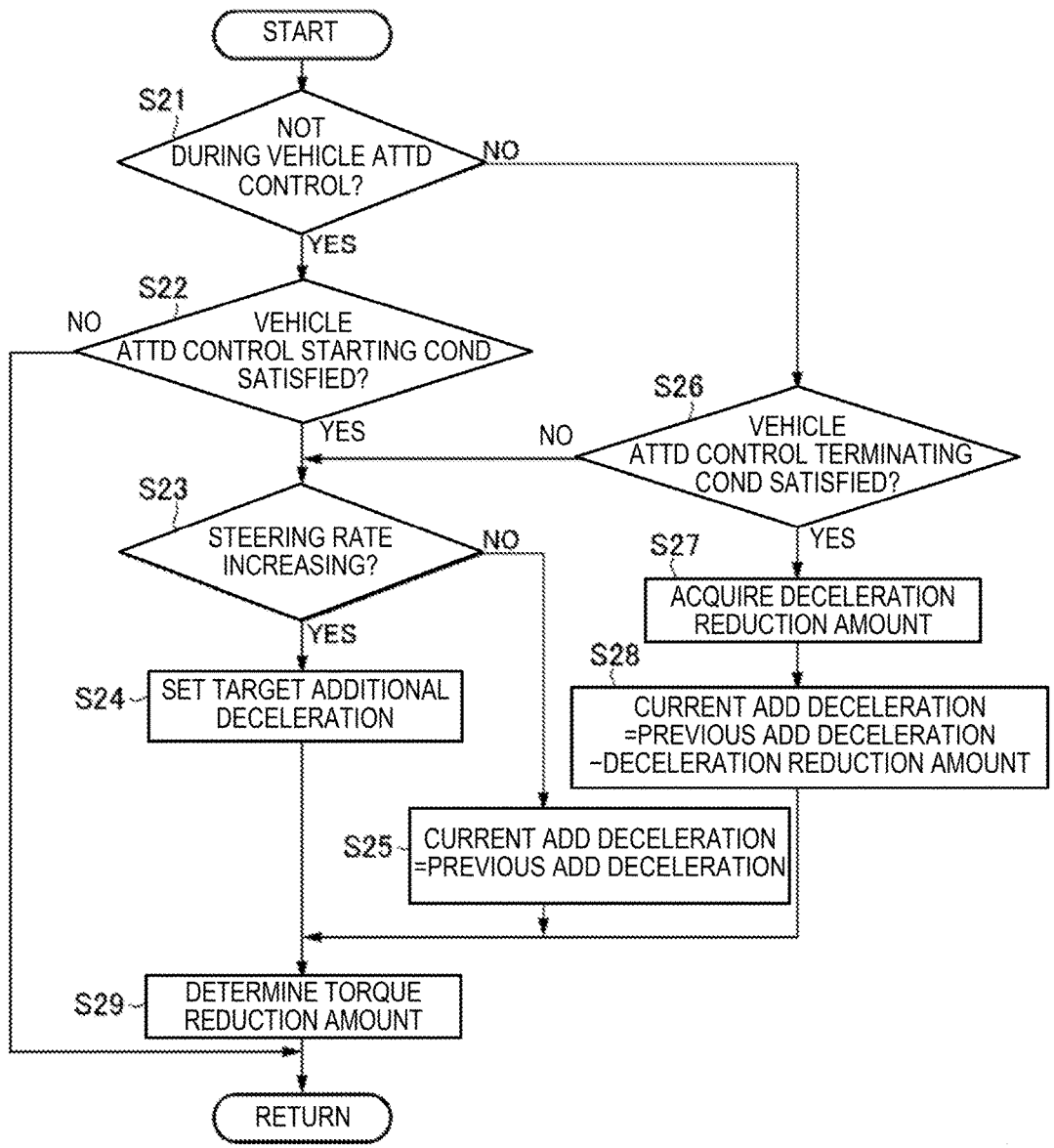
FIG. 6 is a flowchart illustrating a torque reduction amount determination according to the embodiment of the present disclosure.
Figure 7:
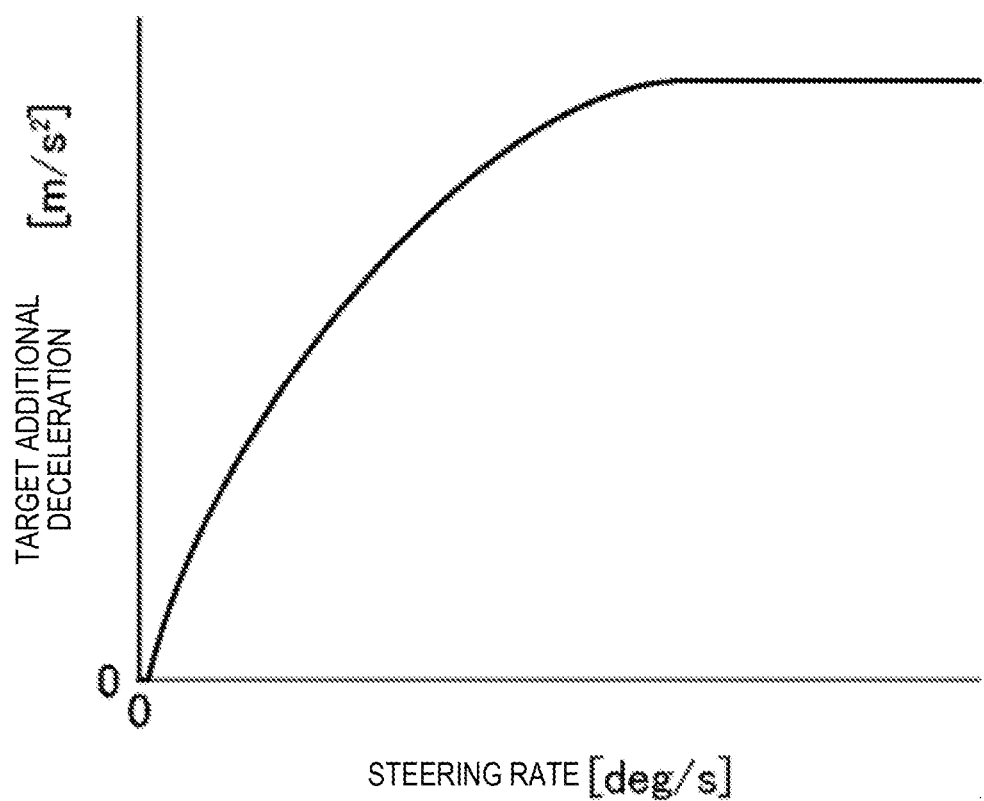
FIG. 7 is a map illustrating a relationship between a target additional deceleration and a steering rate according to the embodiment of the present disclosure.
Figure 8:
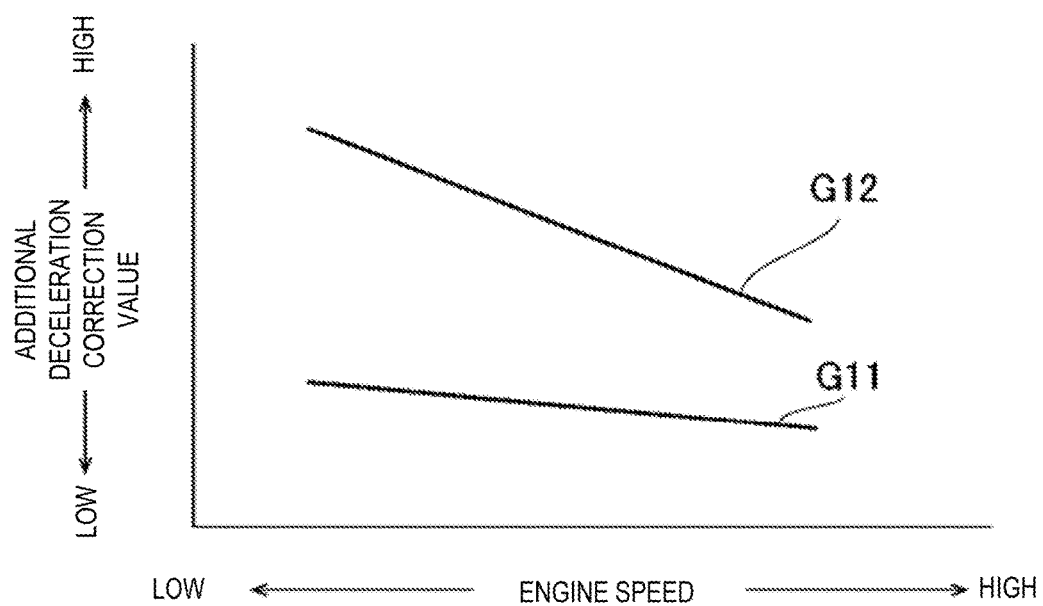
FIG. 8 is a correction map of an additional deceleration according to the embodiment of the present disclosure.
Figure 9:
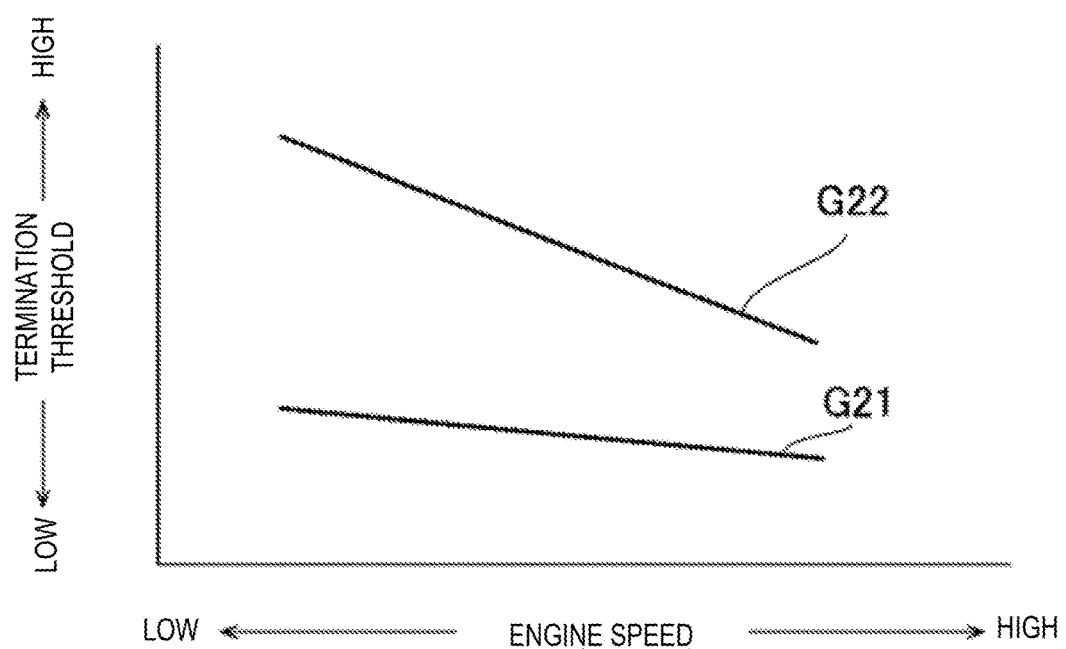
FIG. 9 is a map defining a termination threshold of a vehicle attitude control according to the embodiment of the present disclosure.

FIG. 5 is a flowchart illustrating an engine control according to the embodiment of the present disclosure. FIG. 6 is a flowchart illustrating a torque reduction amount determination according to the embodiment of the present disclosure. FIG. 7 is a map illustrating a relationship between a target additional deceleration and the steering rate according to the embodiment of the present disclosure. FIG. 8 is a correction map of an additional deceleration according to the embodiment of the present disclosure. FIG. 9 is a map defining a termination threshold of the vehicle attitude control according to the embodiment of the present disclosure.

The engine control of FIG. 5 is activated when an ignition switch of the vehicle is turned ON, and power is supplied to a control device of the engine. The engine control is repeatedly performed, basically while the vehicle is traveling.

When the engine control is started, as illustrated in FIG. 5, the PCM 50 acquires an operating state of the vehicle at S1. For example, the PCM 50 acquires, as the operating state, the detection signals S130 to S141 outputted from the various sensors 30 to 41, including the accelerator opening detected by the accelerator opening sensor 30, the vehicle speed detected by the vehicle speed sensor 39, the steering angle detected by the steering angle sensor 40, and a gear position currently set in an automatic transmission of the vehicle. Further, the PCM 50 determines, based on the engine speed and the engine load, whether the engine 10 is in the reduced-cylinder operation or the all-cylinder operation. Note that the PCM 50 also acquires this operation mode as the operating state. Here, the PCM 50 determines the operation mode with reference to the map of FIG. 4.

Next, at S2, the PCM 50 sets a target acceleration based on the operating state of the vehicle including the accelerator pedal operation acquired at S1. For example, the PCM 50 selects an acceleration characteristic map corresponding to a current vehicle speed and gear position, from acceleration characteristic maps defined for various vehicle speeds and gear positions (they are created in advance and stored in memory, etc.). The PCM 50 determines the target acceleration corresponding to a current accelerator opening by referring to the selected acceleration characteristic map.

Next, at S3, the PCM 50 determines a basic target torque of the engine 10 for achieving the target acceleration determined at S2. Here, the PCM 50 determines the basic target torque within a torque range which is outputtable by the engine 10, based on the vehicle speed, the gear position, a road surface slope, a road surface μ, etc. at this time point.

In parallel to the processes at S2 and S3, the PCM 50 performs the torque reduction amount determination at S4 for determining the torque reduction amount of the vehicle attitude control (torque reduction control) based on the steering angle detected by the steering angle sensor 40. This torque reduction amount determination is described later in detail.

Next, at S5, the PCM 50 determines whether the actual yaw rate detected by the yaw rate sensor 41 is above the upper limit yaw rate. In this determination, typically, by executing the vehicle attitude control, the PCM 50 determines whether the yaw rate larger than the yaw rate expected by the driver occurs in the vehicle. For example, the upper limit yaw rate used in the determination of S5 adopts a yaw rate occurring in a situation where the vehicle becomes the oversteered state due to the vehicle attitude control.

As a result of S5, if the actual yaw rate is above the upper limit yaw rate (S5: YES), the process proceeds to S6 where the PCM 50 corrects the torque reduction amount determined at S4 so that it falls below the upper limit yaw rate. Typically, the PCM 50 performs the correction to reduce the torque reduction amount (absolute value) determined at S4 so as to drop the actual yaw rate to below the upper limit yaw rate. On the other hand, if the actual yaw rate is below the upper limit yaw rate (S5: NO), the process proceeds to S7 without performing the processing at S6.

Next, at S7, the PCM 50 determines an ultimate final target torque to be applied. For example, in the case where the torque reduction amount is corrected at S6, the PCM 50 determines the final target torque by subtracting the corrected torque reduction amount from the basic target torque determined at S3. On the other hand, in the case where the torque reduction amount is not corrected at S6, the PCM 50 determines the final target torque by subtracting the torque reduction amount determined at S4 from the basic target torque. Whereas, in the case where the torque reduction amount is not even determined at S4 (corresponding to the case where the vehicle attitude control is not performed), the basic target torque is determined as the final target torque as it is.

Next, at S8, the PCM 50 determines a target air amount and a target fuel amount for causing the engine 10 to output the final target torque determined at S7. Here, "air amount" means an amount of air introduced into the combustion chamber 11 of the engine 10. Alternatively, it may be a charging efficiency which is obtained by nondimensionalizing the air amount. For example, the PCM 50 calculates a target indicated torque obtained by adding to the final target torque a loss torque caused by a friction loss and a pumping loss, calculates the target fuel amount required for generating the target indicated torque, and based on the target fuel amount and a target equivalent ratio, determines the target air amount.

Next, at S9, in order to introduce to the engine 10 the air by the target air amount determined at S8, the PCM 50 determines the opening of the throttle valve 5 and the timings of the intake valve 12 to be opened and closed via the variable intake valve mechanism 18, in consideration of the air amount detected by the airflow sensor 31.

Next, at S10, the PCM 50 controls the throttle valve 5 and the variable intake valve mechanism 18 based on the throttle opening and the open and close timings of the intake valve 12 determined at S9, and also controls the fuel injector 13 based on the target fuel amount calculated at S8.

Next, at S11, based on the final target torque determined at S7 and an actual amount of air introduced into the combustion chamber 11 by the control of the throttle valve 5 and the variable intake valve mechanism 18 at S9, the PCM 50 sets an ignition timing so that the final target torque is outputted from the engine 10, and controls the ignition plug 14 to perform the ignition at the set ignition timing. After S11, the PCM 50 terminates the engine control.

Next, the torque reduction amount determination illustrated in FIG. 6 is described. This torque reduction amount determination is performed at S4 of FIG. 5.

When the torque reduction amount determination is started, at S21, the PCM 50 determines whether the vehicle attitude control is currently being performed. If the vehicle attitude control is not performed (S21: YES), the process proceeds to S22 where the PCM 50 determines whether the vehicle attitude control starting condition is satisfied. For example, the PCM 50 determines whether a change rate of the steering angle (which may be calculated based on the steering angle acquired at S1) is above a given start threshold. If the change rate of the steering angle is above the start threshold, that is, if the vehicle attitude control starting condition is satisfied (S22: YES), the process proceeds to S23. On the other hand, if the change rate of the steering angle is below the start threshold, that is, if the vehicle attitude control starting condition is not satisfied (S22: NO), the process is terminated.

Next, at S23, the PCM 50 determines whether the steering rate (the change rate of the steering angle) is increasing. As a result, if the steering rate is increasing (S23: YES), the process proceeds to S24 where the PCM 50 sets the target additional deceleration based on the steering rate. This target additional deceleration is a deceleration to be added to the vehicle according to the steering operation so that the vehicle behavior intended by the driver is accurately achieved.

Basically, the PCM 50 acquires the target additional deceleration corresponding to the current steering rate based on a relationship between the target additional deceleration and the steering rate illustrated in the map of FIG. 7. In FIG. 7, the horizontal axis indicates the steering rate and the vertical axis indicates the target additional deceleration. As illustrated in FIG. 7, the target additional deceleration corresponding to the steering rate increases as the steering rate increases. For example, as the steering rate increases, the target additional deceleration increases while the rate of the increase amount becomes lower (to be specific, gradually approaches to a given value).

In this embodiment, the PCM 50 corrects the target additional deceleration determined based on the map of FIG. 7, on the basis of the engine speed and the operation mode (the reduced-cylinder operation or the all-cylinder operation). For example, the PCM 50 corrects the target additional deceleration to be larger during the reduced-cylinder operation than during the all-cylinder operation, and also larger as the engine speed decreases. Next, the correction of the target additional deceleration is described in detail with reference to FIG. 8.

FIG. 8 is a diagram showing a method of correcting the target additional deceleration in the embodiment. In FIG. 8, the horizontal axis indicates the engine speed and the vertical axis indicates a correction value of the target additional deceleration (additional deceleration correction value). For example, in FIG. 8, a graph G11 shows a map applied for the all-cylinder operation, and a graph G12 shows a map applied for the reduced-cylinder operation.

The correction of the target additional deceleration using such an additional deceleration correction value is performed at S24 of FIG. 6. That is, by applying the additional deceleration correction value to the target additional deceleration corresponding to the steering rate (see the map of FIG. 7), the target additional deceleration is corrected. Typically, this correction is performed by multiplying the target additional deceleration by the correction value. Here, as the correction value (absolute value) increases, the target additional deceleration is corrected to be larger, that is, the target additional deceleration (absolute value) is set to a higher value. When the target additional deceleration increases, the torque reduction amount increases and the final target torque is reduced more greatly.

As illustrated in FIG. 8, in this embodiment, during the reduced-cylinder operation, the additional deceleration correction value is set higher than during the all-cylinder operation. In addition, the additional deceleration correction value is set higher as the engine speed decreases. In this embodiment, when the engine 10 is in the reduced-cylinder operation and when the engine speed is low (i.e., when a combustion frequency of the engine 10 per unit time is low), the additional deceleration correction value is increased so that the change amount (and the change rate) of the target additional deceleration becomes larger. In this manner, degradation of a response of the torque reduction by the vehicle attitude control is prevented.

Returning to FIG. 6, as a result of the determination at S23, if the steering rate is not increasing (S23: NO), that is, the steering rate is decreasing or constant, the process proceeds to S25 where the PCM 50 determines the additional deceleration determined in the previous processing as the additional deceleration in the current processing.

Moreover, as a result of the determination at S21, if the vehicle attitude control is already in execution (S21: NO), the process proceeds to S26 where the PCM 50 determines whether the vehicle attitude control terminating condition is satisfied. For example, the PCM 50 determines whether the change rate of the steering angle is below a given termination threshold. Before performing this determination, the PCM 50 sets the termination threshold which defines the vehicle attitude control terminating condition. The termination threshold is a threshold for determining the change rate of the steering angle in order to terminate the vehicle attitude control. Here, the termination threshold is described in detail with reference to FIG. 9.

FIG. 9 is a map defining the termination threshold of the vehicle attitude control according to the embodiment of the present disclosure, in which the horizontal axis indicates the engine speed and the vertical axis indicates the termination threshold. For example, in FIG. 9, a graph G21 shows a map applied for the all-cylinder operation, and a graph G22 shows a map applied for the reduced-cylinder operation.

As illustrated in FIG. 9, in this embodiment, the termination threshold is set higher during the reduced-cylinder operation than during the all-cylinder operation. In addition, the termination threshold is set higher as the engine speed decreases. The vehicle attitude control terminating condition is satisfied when the change rate of the steering angle is below the termination threshold. By increasing the termination threshold, the change rate of the steering angle easily falls below the termination threshold, and therefore, the vehicle attitude control terminating condition is loosened. In this embodiment, when the engine speed is low and when the engine 10 is in the reduced-cylinder operation (i.e., when the combustion frequency of the engine 10 per unit time is low), the termination threshold is set to a high value to loosen the vehicle attitude control terminating condition in order to prevent a degradation in response of the torque resumption when the vehicle attitude control is terminated. In this manner, the torque resumption start timing during the reduced-cylinder operation and when the engine speed is low is advanced.

Particularly, the termination threshold may be set by taking into consideration that during the reduced-cylinder operation and when the engine speed is low, due to the torque reduction amount being increased by the additional deceleration correction value, a yaw rate larger than the yaw rate expected by the driver occurs in the vehicle. That is, a relatively high termination threshold may be applied during the reduced-cylinder operation and when the engine speed is low so that the torque resumption start timing is advanced during the reduced-cylinder operation and when the engine speed is low, and the actual yaw rate falls below the upper limit yaw rate in the vehicle attitude control, in other words, the vehicle comes to be in the oversteered state by the vehicle attitude control.

By applying such a termination threshold, it is prevented that the actual yaw rate exceeds the upper limit yaw rate in the vehicle attitude control, in other words, the vehicle comes to be in the oversteered state as a result of advancing the torque resumption start timing during the reduced-cylinder operation and when the engine speed is low.

Returning to FIG. 6, if the change rate of the steering angle is above the termination threshold, that is, if the vehicle attitude control terminating condition is not satisfied (S26: NO), the process proceeds to S23. In this case, the PCM 50 performs the processing of S23 and thereafter, in order to continue the vehicle attitude control.

On the other hand, if the change rate of the steering angle is below the termination threshold, that is, if the vehicle attitude control terminating condition is satisfied (S26: YES), the process proceeds to S27 where the PCM 50 acquires an amount of reducing in the current processing the additional deceleration determined in the previous processing (deceleration reduction amount). In one example, similar to the target additional deceleration, the PCM 50 calculates the deceleration reduction amount based on the reduction rate corresponding to the steering rate, by using the map as illustrated in FIG. 7. In another example, the PCM 50 calculates the deceleration reduction amount based on a constant reduction rate (e.g., 0.3 m/s$^3$) stored in advance in the memory, etc.

Next, at S28, the PCM 50 determines the additional deceleration in the current processing by subtracting the deceleration reduction amount acquired at S27 from the additional deceleration determined in the previous processing.

After S24, S25 or S28, at S29, the PCM 50 determines the torque reduction amount based on the current additional deceleration determined at S24, S25, or S28. For example, the PCM 50 determines the torque reduction amount required for achieving the current additional deceleration, based on the current vehicle speed, gear position, road surface slope, etc. acquired at S1. After S29, the PCM 50 terminates the torque reduction amount determination and returns to the main routine.

Operations and Effects

Figure 10:
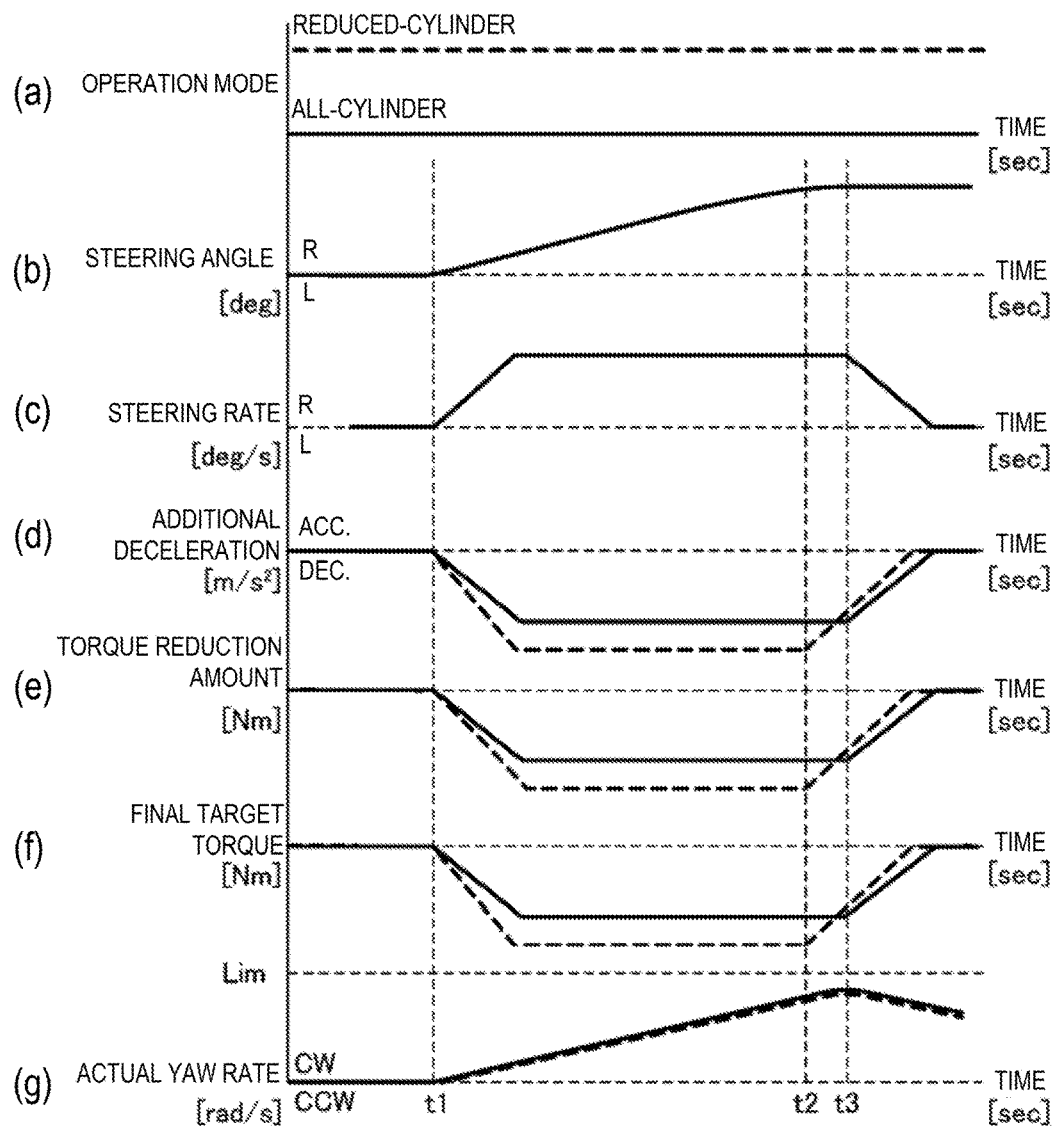
FIG. 10 is a time chart illustrating operations and effects of the vehicle control device according to the embodiment of the present disclosure.

Next, the operations and effects of the vehicle control device according to this embodiment of the present disclosure are described with reference to FIG. 10. FIG. 10 is a time chart illustrating a change of parameters related to the engine control over time in a case where the vehicle equipped with the vehicle control device of this embodiment makes a turn by a steering wheel operation. Here, a situation where the vehicle makes a right turn is illustrated.

Part (a) of FIG. 10 is a line chart illustrating a change in the operation mode of the engine 10, in which the horizontal axis indicates time and the vertical axis indicates the operation mode of the engine 10 (the reduced-cylinder operation mode or the all-cylinder operation mode). Hereinafter, a case where the vehicle attitude control is performed while the engine 10 performs the all-cylinder operation (solid line) and a case where the vehicle attitude control is performed while the engine 10 performs the reduced-cylinder operation (dashed line) are described.

Part (b) of FIG. 10 is a line chart illustrating a change in the steering angle of the vehicle making the right turn, in which the horizontal axis indicates time and the vertical axis indicates the steering angle. As illustrated in Part (b), after the rightward steering operation is started, the rightward steering angle gradually increases up to a largest angle as an additional steering-in operation is performed. Then, the steering angle is kept substantially constant.

Part (c) of FIG. 10 is a line chart illustrating a change in the steering rate of the vehicle making the right turn as illustrated in Part (b), in which the horizontal axis indicates time and the vertical axis indicates the steering rate. The steering rate of the vehicle is expressed by a time differentiation of the steering angle of the vehicle. That is, as illustrated in Part (c) of FIG. 10, when the rightward steering is started, the rightward steering rate is generated and is then kept substantially constant. Then, the rightward steering rate decreases and then becomes zero when the rightward steering angle reaches a largest angle. The steering rate remains zero while the rightward steering angle is fixed.

Part (d) of FIG. 10 is a line chart illustrating a change in the additional deceleration determined based on the steering rate illustrated in Part (c), in which the horizontal axis indicates time and the vertical axis indicates the additional deceleration. In Part (d), the solid line indicates the additional deceleration applied for the all-cylinder operation, and the dashed line indicates the additional deceleration applied for the reduced-cylinder operation (the same definition of the solid and dashed lines is applied to Parts (e) to (g) as well).

Basically, when the vehicle attitude control starting condition in which the change rate of the steering angle is above the start threshold is satisfied (timing t1), the PCM 50 activates the vehicle attitude control to start increasing the additional deceleration (absolute value). For example, the PCM 50 determines the additional deceleration according to the steering speed by referring to the map illustrated in FIG. 7, and determines the additional deceleration correction value according to the operation mode (the reduced-cylinder operation or the all-cylinder operation) and the engine speed by referring to the map illustrated in FIG. 8. Further, the PCM 50 corrects the additional deceleration by the determined additional deceleration correction value to determine the ultimate additional deceleration to be applied. Here, since the determined additional deceleration correction value is higher during the reduced-cylinder operation than the all-cylinder operation (see FIG. 8), the change amount and the change rate of the additional deceleration become higher during the reduced-cylinder operation than the all-cylinder operation (see the solid and dashed lines in Part (d) of FIG. 10). Then, the PCM 50 keeps the additional deceleration once the steering rate becomes substantially constant.

Then, the PCM 50 keeps the additional deceleration once the steering rate becomes substantially constant. When the vehicle attitude control terminating condition in which the change rate of the steering angle is below the termination threshold is satisfied, the PCM 50 starts reducing the additional deceleration (absolute value) to terminate the vehicle attitude control. In this case, the PCM 50 sets the termination threshold corresponding to the operation mode (the reduced-cylinder operation or the all-cylinder operation) and the engine speed by referring to the map illustrated FIG. 9. As a result, since the termination threshold is set higher during the reduced-cylinder operation than during the all-cylinder operation, the reduction of the additional deceleration starts at a timing t3 during the all-cylinder operation and the reduction of the additional deceleration starts at a timing t2 which is before the timing t3 (see the solid line and the dashed line in Part (d) of FIG. 10).

Part (e) of FIG. 10 is a line chart illustrating a change in the torque reduction amount determined based on the additional deceleration illustrated in Part (d), in which the horizontal axis indicates time and the vertical axis indicates the torque reduction amount. The PCM 50 determines the torque reduction amount required for achieving the additional deceleration based on parameters such as the current vehicle speed, the gear position, the road surface slope, etc. Therefore, when these parameters are constant, the torque reduction amount is determined to change similarly to the change of the additional deceleration illustrated in Part (d) during the all-cylinder operation and the reduced-cylinder operation (see the solid and dashed lines of Part (e)).

Part (f) of FIG. 10 is a line chart illustrating a change in the final target torque determined based on the basic target torque and the torque reduction amount, in which the horizontal axis indicates time and the vertical axis indicates torque. The PCM 50 determines the final target torque by subtracting the torque reduction amount determined by the torque reduction amount determination from the basic target torque (here, the basic target torque is substantially fixed). Thus, during the reduced-cylinder operation and the all-cylinder operation, the change of the torque reduction amount illustrated in Part (e) is reflected on the final target torque (see the solid and dashed lines of Part (f)).

Part (g) of FIG. 10 illustrates a change of a yaw rate (actual yaw rate) which occurs in the vehicle when the engine 10 is controlled to achieve the final target torque in the case where the vehicle is steered as illustrated in Part (b). In Part (g), the horizontal axis indicates time and the vertical axis indicates the yaw rate.

Basically, when the rightward steering operation is started and the torque reduction amount is increased as the rightward steering rate increases (see Part (e) of FIG. 10), loads applied to the front wheels, which are steerable wheels of the vehicle, increases. As a result, a frictional force between the front wheels and the road surface increases, a cornering force of the front wheels increases, and turnability of the vehicle improves. Then, since the torque reduction amount is kept at the highest value, the loads applied to the front wheels are maintained while the steering-in operation continues, and the turnability of the vehicle is secured. Then, the torque reduction amount is smoothly reduced. Therefore, in response to the end of the steering-in operation, the loads applied to the front wheels are gradually reduced and the cornering force of the front wheels is reduced so as to stabilize the vehicle body, and the output torque of the engine 10 is restored.

Here, during the reduced-cylinder operation, since the combustion time interval of the engine 10 is relatively long, it is difficult for the engine 10 to suitably achieve the final target torque determined according to the torque reduction amount. That is, during the reduced-cylinder operation, since the time from the issuance of the torque reduction request until reaching the combustion timing of the cylinder 2 the first time is longer than that during the all-cylinder operation, the response of the torque reduction by the vehicle attitude control tends to degrade. Therefore, when the vehicle attitude control is performed during the reduced-cylinder operation, a yaw rate which occurs in the vehicle tends to become small, particularly, a change rate of the yaw rate tends to become gradual. As a result, a desired vehicle behavior in turning is not achieved and the driver feels a sense of discomfort.

In this regard, in this embodiment, during the reduced-cylinder operation, the change amount (and the change rate) of the additional deceleration is made larger than during the all-cylinder operation (see Part (d) of FIG. 10) as described above. Therefore, during the reduced-cylinder operation, the torque reduction amount becomes larger than during the all-cylinder operation (see Part (e) of FIG. 10), and the final target torque is greatly reduced (see Part (f) of FIG. 10). Therefore, according to this embodiment, during the reduced-cylinder operation, the torque reduction by the vehicle attitude control is suitably secured, that is, the degradation of the response of the torque reduction caused by the vehicle attitude control during the reduced-cylinder operation is prevented. As a result, according to this embodiment, after the vehicle attitude control is started, during the reduced-cylinder operation, a relatively large yaw rate similar to during the all-cylinder operation occurs in the vehicle (see the solid and dash lines of Part (g) of FIG. 10). Thus, according to this embodiment, it is suitably prevented that the desired vehicle behavior in turning is not achieved and the driver feels a sense of discomfort due to executing the vehicle attitude control during the reduced-cylinder operation.

Further, in this embodiment, the torque resumption start timing is advanced by setting the termination threshold, which defines the vehicle attitude control terminating condition, to be higher during the reduced-cylinder operation than during the all-cylinder operation (see Parts (d) to (f) of FIG. 10). Also by this, during the reduced-cylinder operation, the response degradation of the torque resumption in the vehicle attitude control is improved and the actual yaw rate is promptly reduced similarly to during the all-cylinder operation (see the solid and dash lines of Part (g) of FIG. 10).

Moreover, in this embodiment, by advancing the torque resumption start timing during the reduced-cylinder operation as described above, particularly at a timing close to a latter half of the vehicle attitude control, the actual yaw rate which occurs in the vehicle during the reduced-cylinder operation is suitably brought lower than an upper limit yaw rate Lim (see the dashed line of Part (g) of FIG. 10). In other words, when the torque reduction amount is increased during the reduced-cylinder operation as described above, an excessive yaw rate occurs and the vehicle may come to be in the oversteered state at the timing close to the latter half of the vehicle attitude control (near the torque resumption start timing). In this regard, according to this embodiment, the torque resumption start timing is advanced during the reduced-cylinder operation so as to reduce the applied torque reduction amount (absolute value) in an early stage. Thus, the actual yaw rate is suitably brought lower than the upper limit yaw rate Lim. Therefore, according to this embodiment, it is prevented that the yaw rate larger than the yaw rate expected by the driver in the vehicle attitude control occurs in the vehicle. Typically, it is prevented that the vehicle comes to be in the oversteered state by the vehicle attitude control.

Note that although FIG. 10 illustrates the example in which the actual yaw rate is maintained below the upper limit yaw rate Lim in the vehicle attitude control, if the actual yaw rate exceeds the upper limit yaw rate Lim in the vehicle attitude control, the applied torque reduction amount (absolute value) may be corrected to be reduced so that the actual yaw rate is brought lower than the upper limit yaw rate Lim (see S5 and S6 of FIG. 5).

Modifications

Next, various modifications of the embodiment described above are described.

In the above embodiment, the torque resumption start timing is changed by controlling the termination threshold based on the operation mode of the engine 10 (the reduced-cylinder operation or the all-cylinder operation) and the engine speed (see FIG. 9). In another example, in addition to/alternatively to the change of the torque resumption start timing, the change amount and/or the change rate of the engine torque in the resuming direction may be changed. In other words, the change amount and/or the change rate of the engine torque in the resuming direction may be increased during the reduced-cylinder operation and when the engine speed is low. In this case, at S27 of FIG. 6, the deceleration reduction amount of (absolute value) may be set relatively large. In still another example, the change may be conducted on at least one of the torque resumption start timing, the change amount, and the change rate in the resuming direction based on only one of the operation mode and the engine speed, or based on the combustion frequency of the engine 10 per unit time instead of the operation mode and the engine speed.

In the embodiment described above, both of the torque reduction amount and the torque reduction rate (change rate) by the vehicle attitude control are changed (e.g., in the example of FIG. 10, both of them are increased during the reduced-cylinder operation) based on the operation mode of the engine 10 and the engine speed. In another example, the change may be conducted on only one of the torque reduction amount and the torque reduction rate. Further, without limiting to changing the torque reduction amount and/or the torque reduction rate based on both of the operation mode and the engine speed, in another example, the torque reduction amount and/or the torque reduction rate may be changed based on only one of the operation mode and the engine speed. In still another example, instead of the operation mode of the engine 10 and the engine speed, the torque reduction amount and/or the torque reduction rate, by the vehicle attitude control, may be changed by directly using the combustion frequency of the engine 10 per unit time. In this example, the number of times that the combustion is performed in the engine 10 is counted (e.g., by using an in-cylinder pressure sensor, etc.), and the torque reduction amount and/or the torque reduction rate may be increased as the counted number is lower.

In the above embodiment, the present disclosure is applied to the engine 10 (four-cylinder engine) having two operation modes of the reduced-cylinder operation and the all-cylinder operation. With this engine 10, the reduced-cylinder operation mode is configured by suspending two of the cylinders 2A to 2D and operating the remaining two cylinders. In another example, the present disclosure may be applied to an engine having two or more operation modes as the reduced-cylinder operation. For example, in a case of applying to a six-cylinder engine, it is capable of achieving, in addition to an all-cylinder operation mode in which all the six cylinders are operated, two reduced-cylinder operation modes including a mode where two cylinders are suspended while the remaining four cylinders are operated and a mode where three cylinders are suspended while the remaining three cylinders are operated. In the case where the present disclosure is applied to the engine having two or more reduced-cylinder operation modes, the torque reduction amount and/or the torque reduction rate by the vehicle attitude control may be increased as the number of suspended cylinders becomes larger.

In the embodiment described above, the torque reduction amount is corrected to bring the actual yaw rate detected by the yaw rate sensor 41 lower than the upper limit yaw rate. However, in another example, the actual yaw rate may not be detected directly by the yaw rate sensor 41. That is, it may be such that a state value related to the yaw rate is detected by another sensor, the actual yaw rate is calculated based on the detected value, and the torque reduction amount is corrected to bring the actual yaw rate lower than the upper limit yaw rate. In still another example, the correction may not be performed based on such a yaw rate. That is, when the oversteered state of the vehicle is detected based on the steering angle, the vehicle speed, the actual yaw rate, a lateral acceleration, etc. (various known methods are applicable for detecting the oversteered state), the torque reduction amount may be corrected to cancel the oversteered state. In further still another example, the actual yaw rate and the oversteered state may not be detected and the torque reduction amount may not be corrected. That is, maps such as the map of the target additional deceleration, the correction map of the additional deceleration and the map of the termination threshold may be defined by experiments and/or simulations beforehand so that the actual yaw rate in the vehicle attitude control falls below the upper limit yaw rate (i.e., so that the vehicle does not come to be in the oversteered state in the vehicle attitude control), and the torque reduction amount may be determined by using such maps.

In the above embodiment, the vehicle attitude control is performed based on the steering angle and the steering rate. However, in another example, instead of the steering angle and the steering rate, the vehicle attitude control may be performed based on the yaw rate or the lateral acceleration. These steering angle, steering rate, yaw rate, and lateral acceleration are examples of the "steering angle related value."

In the embodiment described above, the vehicle on which the control device of the vehicle is mounted is provided with the engine 10 configured to drive drive wheels of the vehicle. In another example, the vehicle control device according to the present disclosure may be applied to a vehicle provided with a motor configured to drive the drive wheels by electric power supplied from a battery or a capacitor (typically, a hybrid vehicle (HV) or an electric vehicle (EV)). In this example, as the vehicle attitude control, the controller 50 executes a control of reducing torque (output) of the motor. Further in this example, the motor may be referred to as the "drive source" and various actuators configured to adjust the torque of the motor may be referred to as the "transmission torque control mechanism."

Further, in the vehicle attitude control, without limiting to directly controlling the torque generated by the drive source, such as the engine 10 or the motor, torque which is actually transmitted (transmission torque) to the drive wheels of the vehicle may be controlled according to the torque generated by the drive source. This is because the transmission torque to the drive wheels influences the vehicle attitude directly. For example, in a case where a generator (e.g., alternator) is provided in a torque transmission path extending from the drive source to the drive wheels, torque obtained by subtracting the torque corresponding to the work of the generator from the torque generated by the drive source is the transmission torque of the drive wheels. In this example, without limiting to directly controlling the torque generated by the drive source, the transmission torque of the drive wheels may be adjusted by controlling the generator, and thus, the vehicle attitude control described above may be achieved.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
2 (2A-2D) Cylinder
5 Throttle Valve
10 Engine
13 Fuel Injector
14 Ignition Plug
18 Variable Intake Valve Mechanism
20 Valve Stopping Mechanism
30 Accelerator Opening Sensor
39 Vehicle Speed Sensor
50 PCM (Power-train Control Module)
51 Vehicle Attitude Controlling Module
100 Engine System

What is claimed is:

1. A vehicle control device, comprising:
a drive source configured to generate torque as a driving force of a vehicle;
a transmission torque control mechanism configured to control transmission torque to drive wheels of the vehicle according to the generated torque; and
a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied,
wherein the vehicle attitude controlling module controls the transmission torque by the transmission torque control mechanism so as to cause a yaw rate that occurs in the vehicle while the vehicle attitude control is performed, to be lower than an upper limit yaw rate.

2. The vehicle control device of claim 1, wherein the vehicle attitude controlling module controls at least one of a change amount of the transmission torque in the resuming direction, a change rate of the transmission torque in the resuming direction, and a timing of starting the resumption of the transmission torque.

3. The vehicle control device of claim 2, wherein
the drive source is an engine including a plurality of cylinders, and
the vehicle attitude controlling module reduces the transmission torque of the drive wheels by increasing at least one of a reduction amount and a reduction rate of the generated torque by the engine while the vehicle attitude control is performed, as a combustion frequency of the engine per unit time decreases.

4. The vehicle control device of claim 3, further comprising a yaw rate sensor configured to detect a yaw rate that occurs in the vehicle,
wherein, based on the yaw rate detected by the yaw rate sensor, the vehicle attitude controlling module controls the transmission torque by the transmission torque control mechanism so as to cause the yaw rate to be lower than the upper limit yaw rate.

5. The vehicle control device of claim 4, further comprising memory configured to store a map defining the transmission torque with which the yaw rate that occurs in the vehicle while the vehicle attitude control is performed falls below the upper limit yaw rate,
wherein the vehicle attitude controlling module controls the transmission torque by the transmission torque control mechanism based on the transmission torque defined in the map stored in the memory.

6. The vehicle control device of claim 5, further comprising a steering angle sensor configured to detect the steering angle of the steering device,
wherein the vehicle attitude controlling module determines that the steering angle related value increases when a change rate of the detected steering angle is higher than a given speed.

7. The vehicle control device of claim 2, wherein
the drive source is an engine, and
the vehicle attitude controlling module reduces the transmission torque of the drive wheels by increasing at least one of a reduction amount and a reduction rate of the generated torque by the engine while the vehicle attitude control is performed, as a speed of the engine decreases.

8. The vehicle control device of claim 2, wherein
the drive source is an engine including a plurality of cylinders and configured to be switchable of an operation mode between a reduced-cylinder operation in which combustion in one or some of the plurality of cylinders is suspended and an all-cylinder operation in which combustion is performed in all the plurality of cylinders, and
when the engine performs the reduced-cylinder operation, the vehicle attitude controlling module reduces the transmission torque of the drive wheels by increasing at least one of a reduction amount and a reduction rate of the generated torque by the engine while the vehicle attitude control is performed, to be larger than when the engine performs the all-cylinder operation.

9. The vehicle control device of claim 1, wherein
the drive source is an engine including a plurality of cylinders, and
the vehicle attitude controlling module reduces the transmission torque of the drive wheels by increasing at least one of a reduction amount and a reduction rate of the generated torque by the engine while the vehicle attitude control is performed, as a combustion frequency of the engine per unit time decreases.

10. The vehicle control device of claim 9, further comprising a yaw rate sensor configured to detect a yaw rate that occurs in the vehicle,
wherein, based on the yaw rate detected by the yaw rate sensor, the vehicle attitude controlling module controls the transmission torque by the transmission torque control mechanism so as to cause the yaw rate to be lower than the upper limit yaw rate.

11. The vehicle control device of claim 9, further comprising memory configured to store a map defining the transmission torque with which the yaw rate that occurs in the vehicle while the vehicle attitude control is performed falls below the upper limit yaw rate,
　wherein the vehicle attitude controlling module controls the transmission torque by the transmission torque control mechanism based on the transmission torque defined in the map stored in the memory.

12. The vehicle control device of claim 1, wherein
the drive source is an engine, and
the vehicle attitude controlling module reduces the transmission torque of the drive wheels by increasing at least one of a reduction amount and a reduction rate of the generated torque by the engine while the vehicle attitude control is performed, as a speed of the engine decreases.

13. The vehicle control device of claim 12, further comprising a yaw rate sensor configured to detect a yaw rate that occurs in the vehicle,
　wherein, based on the yaw rate detected by the yaw rate sensor, the vehicle attitude controlling module controls the transmission torque by the transmission torque control mechanism so as to cause the yaw rate to be lower than the upper limit yaw rate.

14. The vehicle control device of claim 1, wherein
the drive source is an engine including a plurality of cylinders and configured to be switchable of an operation mode between a reduced-cylinder operation in which combustion in one or some of the plurality of cylinders is suspended and an all-cylinder operation in which combustion is performed in all the plurality of cylinders, and
when the engine performs the reduced-cylinder operation, the vehicle attitude controlling module reduces the transmission torque of the drive wheels by increasing at least one of a reduction amount and a reduction rate of the generated torque by the engine while the vehicle attitude control is performed, to be larger than when the engine performs the all-cylinder operation.

15. The vehicle control device of claim 1, further comprising a yaw rate sensor configured to detect a yaw rate that occurs in the vehicle,
　wherein, based on the yaw rate detected by the yaw rate sensor, the vehicle attitude controlling module controls the transmission torque by the transmission torque control mechanism so as to cause the yaw rate to be lower than the upper limit yaw rate.

16. The vehicle control device of claim 1, further comprising memory configured to store a map defining the transmission torque with which the yaw rate that occurs in the vehicle while the vehicle attitude control is performed falls below the upper limit yaw rate,
　wherein the vehicle attitude controlling module controls the transmission torque by the transmission torque control mechanism based on the transmission torque defined in the map stored in the memory.

17. The vehicle control device of claim 1, further comprising a steering angle sensor configured to detect the steering angle of the steering device,
　wherein the vehicle attitude controlling module determines that the steering angle related value increases when a change rate of the detected steering angle is higher than a given speed.

18. A vehicle control device, comprising:
a drive source configured to generate torque as driving force of a vehicle;
a transmission torque control mechanism configured to control transmission torque to drive wheels of the vehicle according to the generated torque; and
a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied; and
a yaw rate sensor configured to detect a yaw rate that occurs in the vehicle,
wherein the vehicle attitude controlling module controls the transmission torque by the transmission torque control mechanism to cause the yaw rate detected by the yaw rate sensor while the vehicle attitude control is performed, to be lower than an upper limit yaw rate.

19. A vehicle control device, comprising:
a drive source configured to generate torque as driving force of a vehicle;
a transmission torque control mechanism configured to control transmission torque to drive wheels of the vehicle according to the generated torque; and
a processor configured to execute a vehicle attitude controlling module to perform a vehicle attitude control by controlling the transmission torque control mechanism to reduce the transmission torque so as to decelerate the vehicle when a starting condition is satisfied, and then, when a given terminating condition for stopping the transmission torque reduction is satisfied, controlling the transmission torque control mechanism to resume the transmission torque back to the torque before being reduced, the starting condition being a condition that the vehicle is traveling and a steering angle related value that is related to a steering angle of a steering device increases is satisfied; and
memory configured to store a map defining the transmission torque with which a yaw rate that occurs in the vehicle while the vehicle attitude control is performed falls below an upper limit yaw rate,
wherein the vehicle attitude controlling module controls the transmission torque by the transmission torque control mechanism based on the transmission torque defined in the map stored in the memory.

* * * * *